Nov. 28, 1939.　　　E. A. HANSEN　　　2,181,429

SPEED GOVERNOR FOR AUTOMOTIVE VEHICLES

Filed June 12, 1939

Inventor
EVERETT A. HANSEN
Chas. C. Reif.
Attorney.

Patented Nov. 28, 1939

2,181,429

UNITED STATES PATENT OFFICE 2,181,429

SPEED GOVERNOR FOR AUTOMOTIVE VEHICLES

Everett A. Hansen, St. Paul, Minn.

Application June 12, 1939, Serial No. 278,679

6 Claims. (Cl. 180—82.1)

This invention relates to a governor for controlling the speed of an automotive vehicle. Such governors are desired in many cases and one common use is for automobiles driven by employees of a firm, which firm desires to limit the speed of said automobiles. Some of the governors proposed use a centrifugal switch which is adapted to close when the automotive vehicle reaches a certain speed. One governor now on the market controls the supply of gas to the motor for regulating the speed. This has been found to have certain objections and the present invention is an improvement over such a governor.

It is an object of this invention to provide a governor for regulating the speed of an automotive vehicle which operates by controlling the ignition circuit of the motor of said vehicle.

If the ignition circuit is open for a period while the motor continues to run there is apt to be a bad backfire when the ignition is again closed which might cause considerable damage.

It is also an object of this invention to provide means for preventing such a backfire.

These and other objects and advantages of the invention will be fully set forth in the following description made in connection with the accompanying drawing in which like reference characters refer to similar parts throughout the several views and in which:

Fig. 2 is a vertical section through a centrifugal switch used; and

Fig. 3 is a front view of a speedometer.

Figure 1:
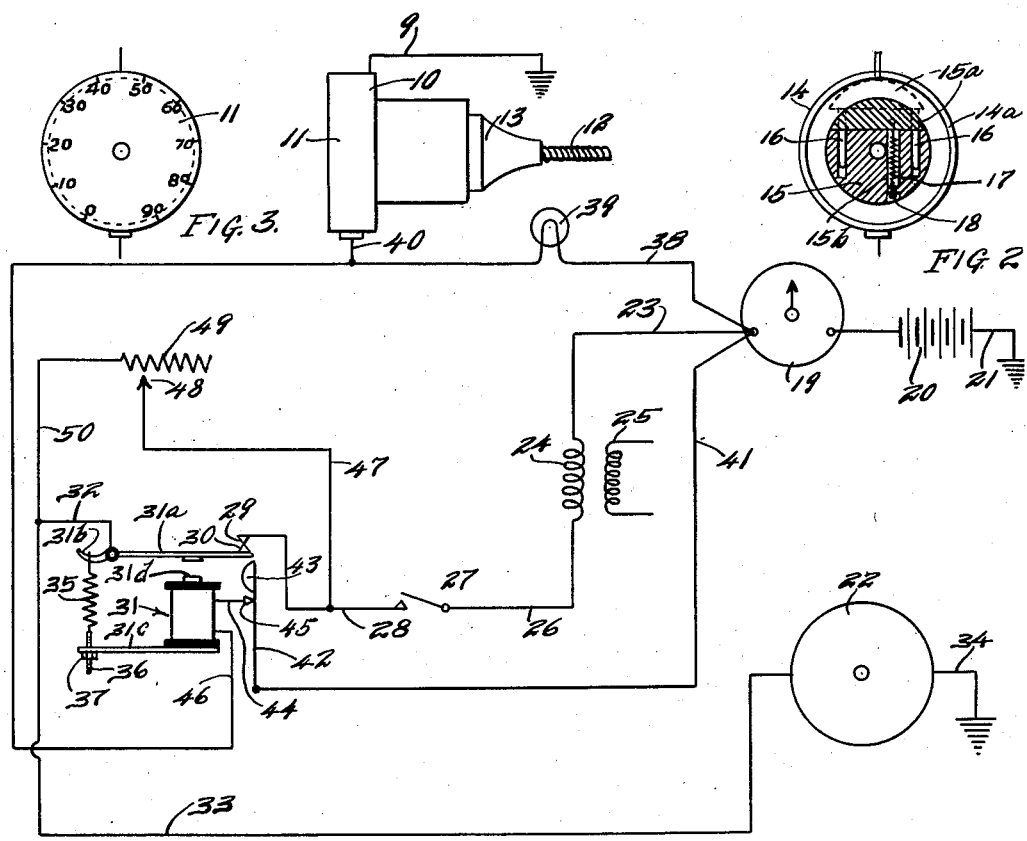
Fig. 1 is a diagrammatic view showing the various parts and circuits used in the invention.

The present invention uses a centrifugal switch of any suitable type driven from the motor of the automotive vehicle to be controlled, which motor will be of the internal combustion type. While the centrifugal switch might be placed in any convenient position, in the embodiment of the invention illustrated it is designated 10 and is connected to the speedometer 11. The speedometer is driven by a flexible shaft 12 having the member 13 connected thereto, which is in turn connected to the speedometer mechanism. While any type of switch adapted to close at a certain speed might be used, in Fig. 2 one type of a centrifugal switch is illustrated. This comprises a casing 14 having a metallic rim 14a which will be connected to the ground side of the battery by conductor 9 which is usually connected to the frame of the automobile. A rotating member 15 is provided, the same being of cylindrical form and having a separate movable segment 15a. This segment has secured thereto guide pins 16 movable in holes in the member 15a. Segment 15a is held in place by a tensile coiled spring 17 disposed in a hole or recess 15b in member 15, one end of said spring being connected to an adjusting screw 18 threaded into member 15. The other side of the battery will be connected to the block 15. When the speed reaches the desired limit segment 15a will be moved outwardly away from member 15 by centrifugal force and will contact rim 14a and close the circuit. The ammeter 19 of the automobile is shown, one side or contact of which is connected to the battery 20. Battery 20 will be the ordinary battery of the automobile which supplies current to the ignition circuit. One side of the battery is as usual connected to ground or to the frame of the machine by a conductor 21. The ignition circuit of the automobile is shown or that part of it which extends to the distributor 22. This circuit includes a conductor 23 which extends from the other side or contact of ammeter 19 to the primary coil 24 of the ignition transformer. The secondary coil is shown as 25. A conductor 26 extends from primary coil 24 to the usual ignition switch 27. This switch is commonly closed by a key when the motor is to be operated. A conductor 28 extends from switch 27 to a contact 29. Contact 29 cooperates with and is adapted to engage a contact 30 carried on the pivoted and swingable armature 13a of an electromagnetic relay 31. A conductor 32 extends from the end of armature 31a and is connected to another conductor 33 which extends to the distributor 22. The distributor 22 is connected by a conductor 34 to ground or to the frame of the vehicle. A tensile coiled spring 35 is connected to a hook or projection 31b on armature 31a and is connected at its other end to a threaded stud 36 extending through the support or bracket 31c of relay 31, said stud being provided with a nut 37 engaging support or bracket 31c. The core of said relay is shown at 31d. A circuit is provided adapted to be closed by the centrifugal switch described and this circuit includes a conductor 38 extending from one side or contact of ammeter 19 to a lamp 39 and to a conductor 40 connected to member 15 of the centrifugal switch. Another circuit is provided controlled by the centrifugal switch and this includes a conductor 41 connected to the side of the ammeter with which contacts 23 and 38 are connected and this conductor 41 extends to a spring member or resilient contact arm 42. Arm 42 is supported adjacent relay 31 and carries a cam member 43 at one end. Cam member 43 is disposed so as to be engaged by the end of armature 31a when relay 31 is energized. A conductor 44 extends from one end of the winding of relay 31 and has a contact 45 thereon engaging contact arm 42. A conductor 46 extends from the other end of the winding of relay 31 to conductor 40 with which it is connected. Another and shunt circuit is provided comprising a conductor 47 which connects with conductor 28 forming part of the ignition circuit and disposed at one side of relay 31. Conductor 47 is connected to a contact 48 comprising the movable contact of an adjustable resistance 49. A conductor 50 is connected to resistance 49 and connects with conductor 32 also forming part of the ignition circuit and disposed at the other side of the relay from conductor 28.

In operation, the centrifugal switch will be set to close at the desired speed by adjustment of screw 18. If, for instance, the switch is set for a 40 mile limit it will thus close at such speed. When the centrifugal switch closes a circuit will be closed extending from ground through conductor 21 to battery 20. From battery 20 the circuit will pass through ammeter 19, conductor 38, lamp 39, conductor 40 and through the centrifugal switch to ground through conductor 9. The lamp 39 is provided to indicate to the driver of the vehicle that he has reached the limit of speed.

When said limit is reached and the centrifugal switch closes, another circuit will be closed extending from ground at one side of the battery through conductor 21 to battery 20, through ammeter 19, through conductor 41, contact strip 42, contact 45, through the winding of relay 31, through conductor 46 to conductor 40 and through the centrifugal switch and conductor 9 to ground. This circuit will, when thus closed by the centrifugal switch, energize and actuate relay 31 so that armature 31a will be moved toward the core 31d of said relay. This will separate contacts 29 and 30 and will open the ignition circuit, which as above described extends through said contacts. With the ignition circuit open the motor of the automobile will, of course, be prevented from operating. Should the ignition circuit be thus opened while the vehicle is traveling at such speed and be maintained open for a period, the combustible gas mixture would be drawn into the cylinders and pass into the exhaust manifold and muffler. When the ignition circuit was again closed there would be an explosion or backfire of this combustible mixture and serious damage might be done to the muffler or exhaust manifold. In order to prevent this the above described shunt circuit including conductors 47 and 50 is provided. The adjustable resistance 49 can be adjusted to suit the individual vehicle so that there will be just a slight current flow in the ignition circuit. This will permit an occasional firing by one of the spark plugs so that there can be no dangerous accumulation of combustible gases. As a further means for preventing the accumualtion of combustible gases the member 42 with its cam 43 is provided. When armature 31a moves sufficiently toward core 31d the end of the armature will engage cam 43 and move contact strip 42 away from contact 45. This will open the circuit through the relay which will be deenergized and spring 35 will move armature 31a to again engage contacts 29 and 30. This will close the ignition circuit and will permit a brief operation thereof and of the spark plugs. It frequently happens that a driver operating a vehicle provided with a governor will place extra pressure on the accelerator when the governor begins to operate. This is done in an attempt to increase the speed of the vehicle in spite of the governor. If this is done with the present invention the armature 31a will operate cam 43 and strip 42 to momentarily restore the ignition circuit and prevent the accumulation of gas. As soon as the circuit through the relay is broken the ignition circuit will be restored and the centrifugal switch will again close the circuit through the relay. There will thus be a vibration of the armature and the ignition will be interrupted sufficiently to prevent the vehicle from exceeding the speed for which the governor is set.

From the above description it is seen that I have provided a simple and efficient governor control for limiting the speed of the automobile. It is not necessary to regulate the admission of the gas or combustible mixture. As long as the speed is below the speed for which the governor is set the motor will function in its normal manner. The device is quite simple and can be readily installed on vehicles already in service. The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A governor for an automotive vehicle having an internal combustion motor with an ignition circuit comprising a centrifugal switch adapted to move to closed position when said vehicle attains a certain speed, a circuit closed by said switch, an electromagnetic relay, the winding of which is included in said circuit, an armature for said relay, contacts controlled by said armature included in said ignition circuit and arranged to be separated when said relay is energized to open said ignition circuit and means associated with relay and ignition circuit to permit a small amount of current to flow in the latter when said contacts are separated.

2. A governor for an automotive vehicle having an internal combustion motor with an ignition circuit comprising a centrifugal switch adapted to move to closed position when said vehicle attains a certain speed, a circuit closed by said switch, an electromagnetic relay, the winding of which is included in said circuit, an armature for said relay, contacts controlled by said armature included in said ignition circuit and arranged to be separated when said relay is energized to open said ignition circuit and a shunt circuit having a resistance therein extending about said relay from said ignition circuit.

3. A governor for an automotive vehicle having an internal combustion motor with an ignition circuit comprising a centrifugal switch adapted to move to closed position when said vehicle attains a certain speed, a circuit closed by said switch, means in said circuit for opening said ignition circuit and means for permitting a small amount of current to flow in said ignition circuit including a shunt circuit extending about said last mentioned means from said ignition circuit and an adjustable resistance in said shunt circuit.

4. A governor for an automotive vehicle having an internal combustion motor with an ignition circuit comprising a centrifugal switch adapted to move to closed position when said vehicle attains a certain speed, a circuit closed by said switch, an electromagnetic relay, the winding of which is included in said circuit, an armature for said relay, contacts controlled by said armature included in said ignition circuit and arranged to be separated when said relay is energized to open said ignition circuit and means operated by movement of said armature upon energization of said relay to open said first mentioned circuit to momentarily close said ignition circuit.

5. The structure set forth in claim 4, said means including a cam engaged by said armature and a pair of contacts in said circuit controlled thereby.

6. A governor for an automotive vehicle having an integral combustion motor with an ignition circuit comprising a centrifugal switch adapted to move to closed position when said vehicle attains a certain speed, a circuit closed by said switch, means operating by the closing of said circuit for opening said ignition circuit and means associated with said means for permitting a small amount of current to flow in said ignition circuit after operation of said first mentioned means.

EVERETT A. HANSEN.